June 16, 1936. B. P. SCHILTZ 2,044,497
METHOD OF MACHINING METALLIC WORKPIECES
Filed Nov. 9, 1932
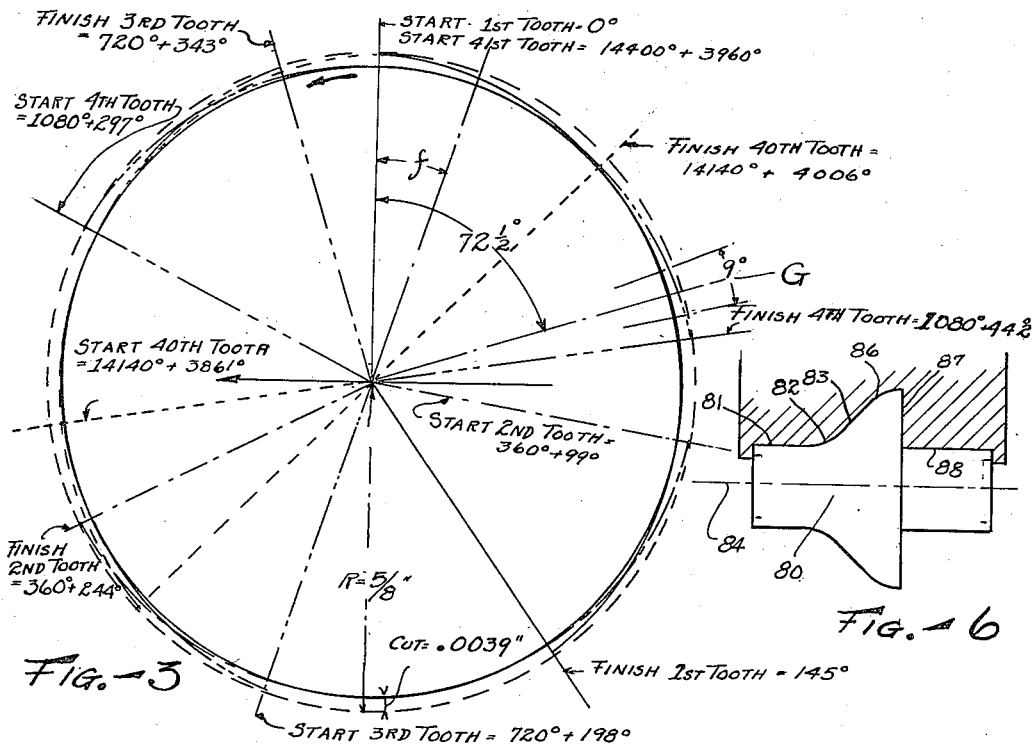
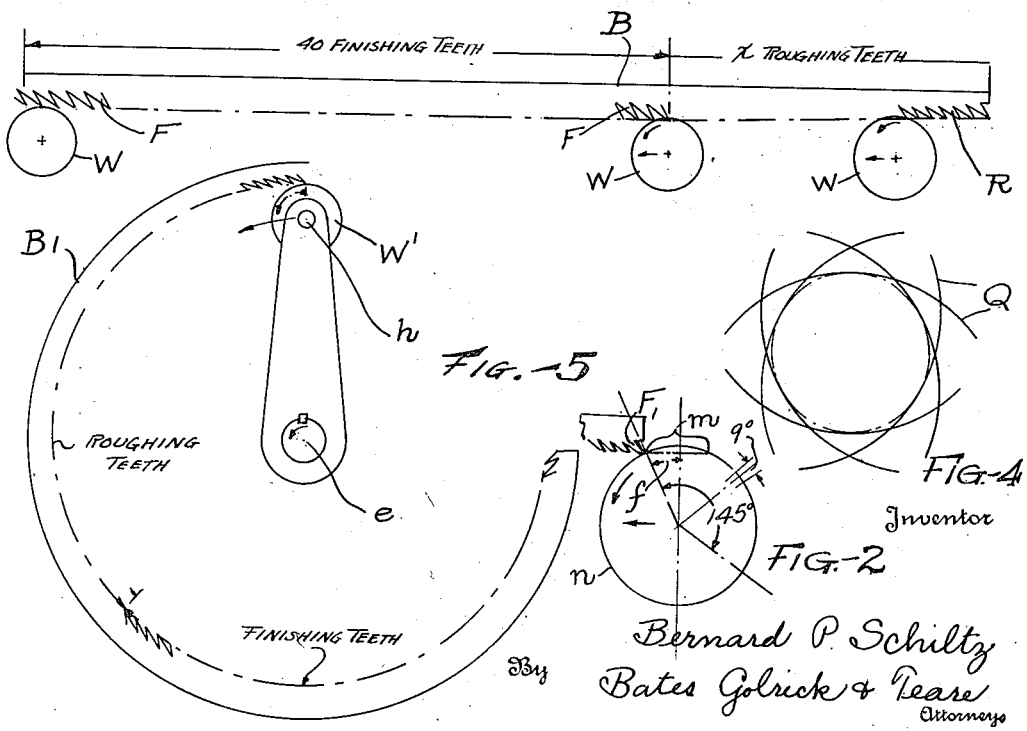
Inventor
Bernard P. Schiltz
By Bates Golrick & Teare
Attorneys Patented June 16, 1936

2,044,497

UNITED STATES PATENT OFFICE 2,044,497

METHOD OF MACHINING METALLIC WORKPIECES

Bernard P. Schiltz, Cleveland, Ohio, assignor, by mesne assignments, to The Bullard Company, Bridgeport, Conn., a corporation of Connecticut Application November 9, 1932, Serial No. 641,852

5 Claims. (Cl. 82—1)

This invention is concerned with the art of machining metal surfaces and has, for its general object, the provision of a new, practical and efficient method of producing turned surfaces of revolution on a work piece.

More specifically, my invention is directed to the provision of a method of effecting metallic cuts upon a workpiece while the workpiece is being moved simultaneously in two directions, the resultant cuts being convex to the axis of rotation of the workpiece.

A further object of my invention is the provision of a novel method of producing accurately finished metallic surfaces on a workpiece, comprising finished surfaces of revolution formed thereby upon the workpiece, the method being practical in forming that class of surfaces of revolution comprising a surface of revolution having the plane thereof normal to the axis of the workpiece,—that is, a radial surface, and a cylindrical surface, and all plain surfaces of revolution intermediate thereof, as well as rounded surfaces of revolution, the axes of which comprise the axis of the workpiece.

Further objects of my invention will hereinafter become apparent from a description of the drawing, the essential characteristics of which are summarized in the claims.

In the drawing Fig. 1 is a diagrammatic representation of a fixed cutting tool in the form of a multi-tooth broaching tool, having a set of roughing teeth and a set of finishing teeth and past which the workpiece is moved with its axis in substantially parallel relation as the workpiece is revolved; Fig. 2 is a diagrammatic representation of the angularity of cut of the first finishing tooth; Fig. 3 is an angular layout, showing the relationship of the cut of the finishing teeth upon a workpiece of specific finished diameter; Fig. 4 is a diagrammatic representation of the curvature of the cut of six of the teeth, the curvatures shown, however, are not the true curvatures of the cut; Fig. 5 is a diagrammatic representation of another manner of utilizing my process by the use of a broach tool, which is arcuately shaped, and the work is both revolved and rotated about fixed axes; and Fig. 6 is a diagram of a workpiece and tool.

My invention contemplates the provision and use of a method of forming turned surfaces on workpieces, which can be utilized by the use of a stationary multi-tooth cutting tool while both revolving the workpiece and simultaneously moving the workpiece axially past the cutting edges of the tool, the plane of movement of the workpiece being substantially parallel to the plane of the cutting edges of the teeth of the tool. For convenience in explanation of this method, I have diagrammatically represented various cutting actions and the manner of obtaining the same in connection with the use of a machine known as an "endless chain stationary broach type", wherein the broaching tool comprises a straight tool having a plurality of cutting teeth which, for the purpose of my method, may be teeth of graduated height or teeth of the same height or a combination of both. The drawing also shows a diagrammatic illustration of the cutting action when the broach is arcuate in shape and provided with any of the arrangements of teeth above referred to, and the work is swung in an arc substantially concentric to the arc of the broach teeth. The work is being revolved while being swung in such an arc.

In my copending application on an apparatus for finishing metal parts, filed concurrently herewith, I show a workpiece finished by the present method, having surfaces of revolution comprising cylindrical surfaces of different diameters, a surface bevelled relative to the axis or the center line of the work, as well as a radial surface,—that is, a surface which is normal to the center line of the workpiece. The number of teeth to be provided in the cutting tool and the pitch thereof,—that is, the linear spacing between teeth, is dependent upon the diameter of the surface to be formed, the kind of metal comprising the workpiece body, the production per minute desired, the degree of accuracy or precision of finish, and the type of tool steel to be used in making the cutting tool. These factors enter into a determination of the linear speed the workpiece is to be moved parallel to the cutting edges of the tool and the revolutions per minute of the workpiece, that is, the ratio of the linear speed to the rotating speed of the workpiece is determined by consideration of the foregoing practical factors.

When the work is being rotated into the cutting edge of the tooth while being moved linearly toward the tooth, (counter-clockwise, see Fig. 1) the curve of the tooth cut effected upon the work is always convex relative to the axis of the work. If the rotating speed of the work is zero, the resultant cut curve is a straight line. Should the workpiece be rotated away from the cutting edge of the tooth (clockwise, see Fig. 1) as the workpiece is being moved linearly toward the tooth the resultant curve of the cut upon the workpiece would be concave relative to the axis of the work. In this application I confine myself to the utilization of convex cuts upon a workpiece to form a practically true surface of revolution, that is, the final finished surface effected by a multipliicty of cuts is as close to a true surface of revolution as can be effected upon a workpiece by any well-known turning method. Mathematically speaking, my method of utilizing convex cuts upon the workpiece when angularly displaced about the circumference of the workpiece numerous times would give a final surface, the curve of which approaches a circle, and I have found that the number of cuts required to produce a practical surface of revolution is well within the practical bounds of machine tool designing.

I will now give one example of the practical application of my process to the finishing of a piece of work approximately one inch and a quarter in diameter and also the method of deriving the proper tool design to obtain the desired result by the use thereof.

In Fig. 1 I diagrammatically represent a workpiece W in the form of a circle and a tool having a plurality of rough cutting teeth R and finishing teeth F. The roughing teeth may be increased progressively in height about one-thousandth of an inch or more while the finishing teeth are all of the same height. Thus, during the action of the finishing teeth upon the workpiece the workpiece is being moved linearly of the cutting teeth in a plane which is parallel to the plane of the cutting edges of the finishing teeth. I find that an angular overlap of each succeeding cut of a finishing tooth relative to a preceding cut of nine degrees, will, practically speaking, produce a true surface of revolution when the angle of each cut is extended over substantially one hundred and forty-five degrees of the circumference of the workpiece. The deepest part of such a cut will be at seventy-two and one-half degrees and the part of this cut surface which will comprise a part of the finished surface of revolution is preferably that part included within the 9° angle from sixty-eight degrees to seventy-seven degrees of the total 145th angle of cut. That 9° part of the cut surface is congruent, practically speaking, to the circle desired.

The final finished cylindrical surface comprises forty of such congruent surfaces of nine degrees circumferentially extended. Hence, by providing forty finishing teeth, all of the same height, and by having a definite relationship between the rotating surface speed of the workpiece and the linear movement of the workpiece relative to the cutting edges of the teeth, I can definitely determine the starting point of the cutting action so that the deepest part of the cut of each succeeding tooth can either precede the prior nine degrees finished surface of the prior tooth cut, or can be successive thereto,—that is, the point of entrance into the work circumference of the second tooth should precede the starting point of the first cut by nine degrees. The effective finished surface of this entire second cut will extend nine degrees preceding the nine-degree perfected cut of the first tooth action. Should the second tooth have a theoretic entrance to the piece of work of nine degrees past the entrance of the first tooth thereinto, then during the first half of the one hundred and forty-five degrees of the angle of cut the tooth would not actually be cutting the work, for it would almost follow the first tooth cut, but during the second half of the forty-five degrees of the second tooth action, cutting would be effected.

I prefer to have a greater angular displacement than nine degrees between the entrance of each finishing tooth to the workpiece circumference, and this can be done providing consideration is given to the pitch of the teeth, the linear speed of the workpiece and the rotating speed thereof.

In Fig. 2 of the drawing I diagrammatically show in an exaggerated manner the relation of the center of the axis of the workpiece "W" and the circumference thereof to the cutting edge of the first finishing tooth "F1", and also the location of the nine degree completed surface. It will be noted that the cutting action upon the circumference of the workpiece by the first finishing tooth F1 is at a point in a vertical plane which precedes a vertical plane through the axis of the workpiece. The angular displacement f is dependent upon the diameter of the workpiece and the depth of cut to be taken by the finishing teeth. The distance m is the linear movement of the workpiece during the angular cut of one hundred and forty-five degrees.

In Fig. 3 a specific illustration of an angular layout is given for a particular piece of work, where the finished diameter of the workpiece is to be 1.2422 inches and for practical purposes of cutting tooth design the pitch of the teeth is seven-sixteenths of an inch. The outside diameter of the workpiece is 1.2500. The diagram shown in Fig. 3, as compared to the diagram shown in Fig. 2, has been turned clockwise relative to the diagram in Fig. 2, through a displacement equal to the angle f, in order that the starting point of the cutting action of the first tooth F1 theoretically will be at the bisection of the outside circumference of the workpiece and a vertical line passing through the center of the workpiece, the deepest part of the cut being at an angular displacement of seventy-two and one-half degrees from the starting point. The angle of nine degrees of finished surface effected by this cut is indicated at G. In this diagram, instead of the second tooth cut entering the work at a point displaced nine degrees preceding the previous cut, there is a lag of ninety-nine degrees in order to start successive cuts substantially ninety degrees apart plus nine degrees to more evenly distribute the stresses upon the work as it is being cut. Hence, the start of the second cut has an accumulated angular displacement of three hundred and sixty degrees, plus ninety-nine degrees relative to the start of the first cut. The third cut would start at seven hundred and twenty degrees plus one hundred and ninety-eight degrees, etc. The displacement being such that after forty cuts had been effected upon the work, there will be forty connected nine-degree surfaces congruent to a circle. Hence, the total revolutions of the workpiece required to traverse the forty teeth and effect the cuts described can be computed. Fig. 4 is an exaggerated diagram illustrating the way the cut curves eventualy form the circle. The curved lines Q do not show the true curve of the cut, but merely portray the general scheme of my method. If a true diagram of the forty curved cuts were given it would have to be greatly enlarged to show with any clarity the actual relationship of the curved cuts.

It will be apparent that the extent of the angularity of the congruent surface (nine degrees) can be increased or decreased, if desired, within practical limits, depending upon the precision of the surface finish desired. The pitch of the teeth can be varied within practical limits, and the number of finishing teeth depend upon the angular extent of the congruent surface of each cut. For example, if a ten-degree displacement were used, thirty-six finishing teeth would be required, etc. In the specific instance illustrated in Fig. 3, the linear speed of the workpiece is twelve and one-half feet per minute, that is, one hundred and fifty inches per minute, the peripheral speed being about eleven point forty-four times twelve and one-half feet per minute, thus giving a cutting speed of about one hundred and fifty-five and a half feet per minute.

Since several of the factors are variable, including the shape of the finish desired, that is, whether it be a cylindrical surface, a bevelled surface, a rounded surface or a radial surface of revolution relative to the axis of the work, some judgment is required in predetermining which variable should be made a constant or disregarded. Accordingly, I have provided formulae which will make available the various data required for the design of a practical tool, as well as the speeds required for the design of a machine adapted to utilize my process. The formulae are as follows:

$N$ = No. of teeth $\frac{360}{N}$ = overlap (°)

$K$ = interval (°) here = $1\frac{1}{4}$ rev. or $450° \left\{ \frac{360}{N} + \right.$ $K = Z$ = No. of degrees from start of 1st cut to start of 2nd cut $P$ = pitch (in.)
$R$ = radius of blank (n.)
$S$ = speed of chain (in./min.)
$C$ = cutting speed of tool (in./min.)
$d$ = depth of cut (in.)
$V$ = angular extent of cut (°)

R. P. M. of blank = $\frac{C-S}{2\pi R}$

Peripheral speed of blank = $C-S$

Ratio peripheral speed to lineal speed of chain = $\frac{\pi R s}{180 P}$ $d = R - \sqrt{R^2 - \frac{(VP^2)}{(2Z)}}$ $V = \frac{2Z\sqrt{2Rd-d^2}}{P}$ or $V = \frac{114.6(C-S)\sqrt{2Rd-d^2}}{SR}$ $P = \frac{2s\sqrt{2Rd-d^2}}{V}$ $P = \frac{ZSR}{57.3(C-S)}$ $S = \frac{57.3\ P.C}{ZR + 57.3P}$ $Z = \frac{57.3P(C-S)}{SR}$ $C = \frac{S(57.3P + ZR)}{57.3P}$ In Fig. 5 I diagrammatically represent the manner of using my method when the broaching tool B1 is arcuately shaped and the work is swung parallel with the cutting edges of the broach about a center $e$. The workpiece W1 also being revolved, and rotated, counterclockwise about a center $h$ which is being swung about the major center $e$. The angle of revolving the displacement of the workpiece about the center would correspond to the distance $m$ in Fig. 2, but the line in Fig. 2 defining the distance $m$ would be slightly arcuate, the arc being struck from the center $e$, in Fig. 5.

From the foregoing description of my invention, it will be apparent to those skilled in the art that if desired irregular surfaces can be generated upon a piece of work by having finishing teeth irregularly spaced and, in some cases, of different heights, the workpiece, of course, having a predetermined linear and rotating movement relative to the teeth. It will also be apparent that the teeth can be formed to have the cutting edges thereof disposed at an angle across the face of the tool to ease the stress burden on both the tooth and the workpiece. The teeth may also be of irregular shape along the cutting edges thereof, whereby bevelled cuts, rounded cuts and cylindrical cuts may all be effected by one set of finishing teeth and radial cuts can be effected by having the teeth disposed in a plane normal to the axis of the workpiece, or, if only a small amount of metal is to be removed from the workpiece surface, the teeth may be as shown in Fig. 1.

In the specific instance shown in Fig. 3, the degree of accuracy of the finished diameter of the workpiece is within .0001 inch of perfection, and this extent of precision will meet practically all precision requirements throughout the various industries.

I have not shown in the drawing any specimens of workpieces, the surfaces of which have been generated by my method, and which surfaces are not surfaces of revolution. However, in Fig. 6 I do show an example of a workpiece and a cutting edge of one tooth of a tool formed to generate the shape of workpiece shown. The workpiece 80 has a cylindrical surface 81, a curved surface of revolution 82, an angular surface of revolution 83 relative to the axis 84 of the workpiece, a reverse rounded surface 86, a radial surface 87 and a cylindrical surface 88,— all of which can be simultaneously generated by a cutting tool having the contour of cutting edge, shown in Fig. 6. If desired, these cuts can be made at different stages of the tool design or they can all be effected simultaneously, as stated.

It will be apparent that the use of my method is not confined to any particular type of machine design.

I claim:

1. The method of cutting material to a predetermined circumferential shape and size by use of a series of cutting tools, comprising rotating the workpiece body a predetermined number of revolutions per minute and simultaneously moving the axis of rotation of the body at a predetermined rate of speed relative to the cutting tools, while maintaining the tools spaced apart at predetermined distances from each other to thereby effect a series of angularly displaced overlapping non-circular surface cuts, the curvatures of which are convex to the axis of a cylinder.

2. The method of forming a surface of revolution on a piece of work, comprising arranging a series of metal cutting tool teeth substantially tangentially to the path of movement of the workpiece with the spacing thereof predetermined to effect successive overlapping cuts forming a series of non-circular curved surfaces convex to the axis of the surface of revolution, and effecting a single relative movement between the workpiece and all of the cutting edges of the tool teeth while rotating the body of the workpiece a predetermined number of revolutions per minute and while simultaneously moving the axis of rotation of the body of the workpiece at a predetermined rate of speed relative to the tool teeth.

3. The method of forming a surface of revolution on a piece of work, comprising arranging a series of metal cutting tool teeth, substantially tangentially to the path of movement of the workpiece, and making a single passage of the workpiece along the cutting edges of the tool teeth while rotating the body of the workpiece a predetermined number of revolutions per minute to effect successive overlapping of the cuts to thereby form a series of non-circular curved surface cuts while simultaneously moving the axis of rotation of the body to the workpiece at a predetermined rate of speed relative to the tool teeth.

4. The method of forming a surface of revolution on a piece of work, comprising arranging a series of metal cutting tool teeth, with the cutting edges thereof substantially in a plane adjacent the path of movement of the workpiece with the spacing thereof predetermined to effect successive overlapping cuts and effecting a continuous relative movement between the workpiece and the cutting edges of the tool teeth while rotating the body of the workpiece a predetermined number of revolutions per minute and while simultaneously moving the axis of rotation of the body of the workpiece at a predetermined rate of speed relative to the tool teeth.

5. The method of producing a surface revolution on a blank by a series of equidistantly spaced cutting teeth, comprising moving the blank tangentially of the cutters to make a series of overlapping cuts on its periphery, said blank being mounted to rotate and move bodily at right angles to its axis at a predetermined rate of speed and in a direction substantially parallel with the cutting teeth, rotating said blank continuously at a predetermined rate of speed while the cutting teeth pass one by one into and out of engagement with the work, and continuously moving said blank bodily in a direction substantially parallel with the cutting teeth at a predetermined rate of speed while the cutting teeth one by one pass into and out of engagement with the work to thereby form a series of overlapping convex cuts on the surface of the work, each of the cuts representing the work of one cutting tooth and being of equal circumferential length on the surface of the work and of substantially a curvature which is greater than the curvature of the surface of revolution.

BERNARD P. SCHILTZ.